No. 774,635. PATENTED NOV. 8, 1904.
F. H. ARMSTRONG.
ALINER FOR TYPE WRITING MACHINES.
APPLICATION FILED MAY 9, 1904.
NO MODEL.

Witnesses
F. L. Ourand.
W. H. Ourand.

Inventor
Frank H. Armstrong.
By Geo. H. Evans
Attorney

No. 774,635.

Patented November 8, 1904.

UNITED STATES PATENT OFFICE.

FRANK H. ARMSTRONG, OF AUBURN, NEW YORK.

ALINER FOR TYPE-WRITING MACHINES.

SPECIFICATION forming part of Letters Patent No. 774,635, dated November 8, 1904.

Application filed May 9, 1904. Serial No. 207,043. (No model.)

*To all whom it may concern:*

Be it known that I, FRANK H. ARMSTRONG, a citizen of the United States, residing at Auburn, Cayuga county, New York, have invented certain new and useful Improvements in Aliners for Type-Writing Machines, of which the following is a specification.

My invention relates to an aliner for use with a type-writer of the class shown in my Patent No. 717,794, January 3, 1903.

The object of the invention is to provide a simple and inexpensive aliner capable of adjustment to vary the space between its two members and also capable of adjustment toward and from the printing-point or platen. This object I accomplish by the construction shown in the accompanying drawings, in which—

Figure 1:
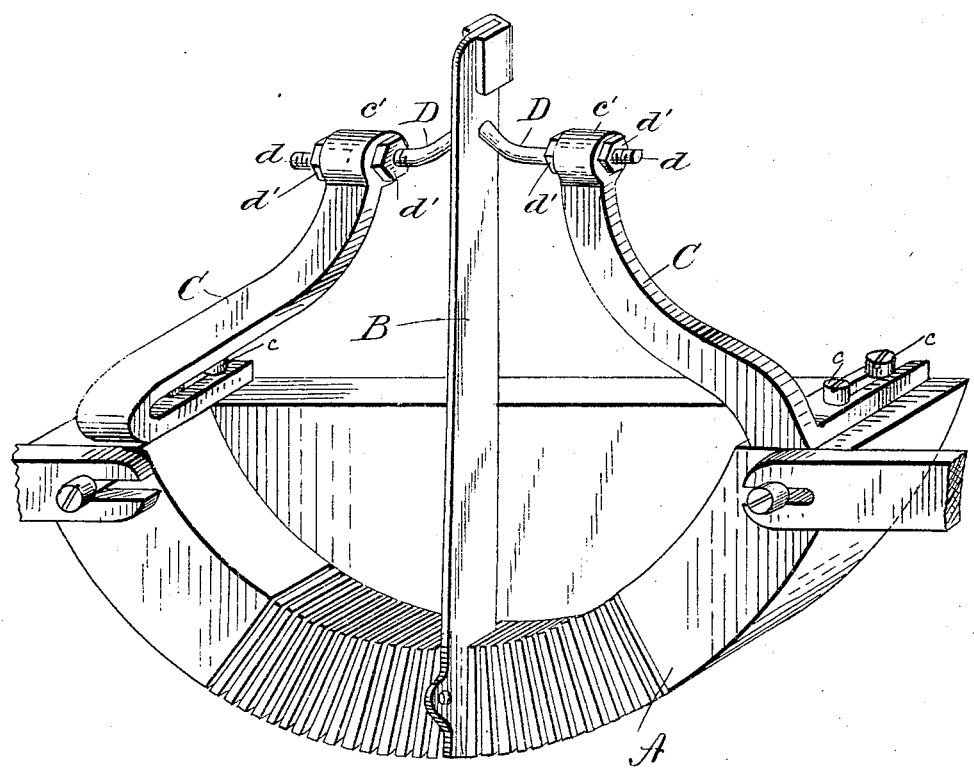
Figure 2:
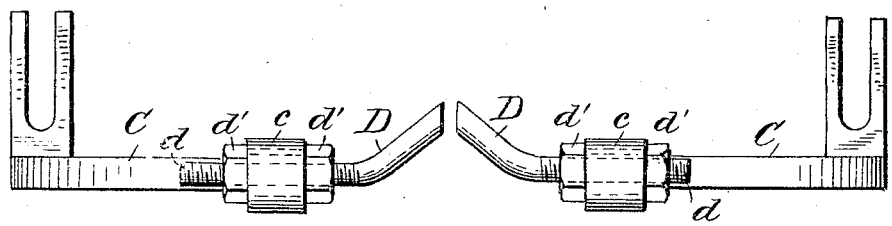

Figure 1 is a perspective of the bar carrying the type-bars with my aliner in position thereon, and Fig. 2 is a detail plan view.

A designates the curved slotted bar to which the series of type-bars is pivoted, only the middle one of such type-bars, B, being shown. C C are standards secured at their lower slotted ends to the upper ends of the curved bar A by screws c or in any desired manner. These standards curve inwardly toward each other at their upper approaching apertured ends c', through which ends are passed the threaded shanks d d of the aliner-arms D D. These aliner-arms D D are bent at an angle to the shanks d d, so that by turning them in or out they may be made to approach or recede from the platen or printing-point. The space between the ends of the arms D D is regulated by moving the shanks longitudinally in the ends c c. The shanks d d are provided at both sides of the standard ends c c with nuts d' d', so that the aliner-arms will be firmly held in their adjusted positions.

It will be seen that I have provided an exceedingly simple means of effecting the two adjustments necessary to the perfect adjustment of an aliner, as it is only necessary to loosen the inner nuts and tighten the outer nuts to bring the arms D D closer together, and vice versa. To move the ends of the arms nearer to or away from the printing-point, loosen one nut of each pair, turn the arms, and then tighten the nuts. A further adjustment of the aliner, as a whole, toward and from the platen may be effected by means of the lower slotted ends of arms D D and the screws c.

Having thus described my invention, what I claim as new, and desire to secure by Letters Patent, is—

1. An aliner for type-writing machines, comprising standards or supports, and inclined type-guiding arms spaced apart at their adjacent ends and having shanks mounted to slide and turn in said standards or supports, whereby the space between the adjacent ends of the arms, and their distance from the platen, may be adjusted.

2. An aliner for type-writing machines comprising standards or supports, inclined type-guiding arms spaced apart at their adjacent ends and having threaded shanks mounted to turn and move longitudinally in said standards or supports, whereby the space between the adjacent ends of the arms, and their distance from the platen, may be adjusted and nuts on the shanks to hold them in their adjusted position.

3. In an aliner for type-writing machines, an inclined type-guiding arm formed with a shank adapted for longitudinal and rotary adjustment for the purposes stated.

4. An aliner for type-writing machines, comprising the standards or supports having slotted lower ends, transversely-apertured upper ends, screws for securing the slotted ends to the machine, inclined type-guiding arms spaced apart at their adjacent ends and having shanks mounted to slide and turn in said standard-apertures, whereby the space between the adjacent ends of the arms, and their distance from the platen, may be adjusted.

5. An aliner for type-writing machines comprising standards or supports provided at their upper ends with alined bearings and type-guiding arms having shanks mounted adjustably in said bearings; the arms being inclined from the shank portions toward the platen or printing-point and spaced apart for the passage of the type-bars.

In testimony whereof I affix my signature in presence of two witnesses.

FRANK H. ARMSTRONG.

Witnesses:
W. H. HARRIS,
H. E. GALLINGER.